United States Patent
Lee et al.

(10) Patent No.: US 9,879,194 B2
(45) Date of Patent: Jan. 30, 2018

(54) METHOD FOR REFORMING COAL USING PALM RESIDUE

(71) Applicant: Korea Institute of Energy Research, Daejeon (KR)

(72) Inventors: Si-Hyun Lee, Daejeon (KR); Nam-Sun Nho, Daejeon (KR); Seung-Hyun Moon, Daejeon (KR); Sang-Do Kim, Daejeon (KR); Dong-Hyuk Chun, Daejeon (KR); Young-Jun Rhim, Daejeon (KR); Jeong-Hwan Lim, Daejeon (KR); Ho-Kyung Choi, Daejeon (KR); Ji-Ho Yoo, Daejeon (KR); Young-Chan Choi, Daejeon (KR); Dong-Wook Lee, Daejeon (KR); In-Soo Ryu, Daejeon (KR); Seung-Jae Lee, Daejeon (KR); Je Kyoung Woo, Daejeon (KR)

(73) Assignee: Korea Institute of Energy Research, Daejeon (KR)

( * ) Notice: Subject to any disclaimer, the term of this patent is extended or adjusted under 35 U.S.C. 154(b) by 173 days.

(21) Appl. No.: 14/375,301

(22) PCT Filed: Sep. 28, 2012

(86) PCT No.: PCT/KR2012/007904
§ 371 (c)(1),
(2) Date: Jul. 29, 2014

(87) PCT Pub. No.: WO2014/051180
PCT Pub. Date: Apr. 3, 2014

(65) Prior Publication Data
US 2014/0366431 A1    Dec. 18, 2014

(30) Foreign Application Priority Data
Sep. 27, 2012    (KR) .......................... 10-2012-0107581

(51) Int. Cl.
*C10L 5/00* (2006.01)
*C10L 5/02* (2006.01)
(Continued)

(52) U.S. Cl.
CPC    *C10L 5/22* (2013.01); *C10L 5/00* (2013.01); *C10L 5/04* (2013.01); *C10L 5/14* (2013.01);
(Continued)

(58) Field of Classification Search
CPC .... C10L 5/00; C10L 5/363; C10L 2200/0469; C10L 2290/08; C10L 2290/28
See application file for complete search history.

(56) References Cited

U.S. PATENT DOCUMENTS 4,705,533 A * 11/1987 Simmons .................. C10F 5/00
44/281
2010/0263271 A1* 10/2010 Lai ........................... C10L 5/10
44/577

FOREIGN PATENT DOCUMENTS

JP    7-233380 A    9/1995
JP    9-3457 A    1/1997
(Continued)

OTHER PUBLICATIONS

Siti ShaSiti Shawalliah Idrisa, Norazah Abd Rahmana, Khudzir Ismailb, Azil Bahari Aliasa, Zulkifli Abd Rashida, Mohd Jindra Arisa, "Investigation on thermochemical behaviour of low rank Malaysian coal, oil palm biomass and their blends during pyrolysis via thermogravimetric analysis (TGA)" Jun. 2010, vol. 101, Issue 12, pp. 4584-4502.*

*Primary Examiner* — Ellen McAvoy
*Assistant Examiner* — Ming Cheung Po
(74) *Attorney, Agent, or Firm* — Vorys, Sater, Seymour & Pease LLP; Mih Suhn Koh (57) ABSTRACT

Provided is a method of economically modifying low rank coal (LRC) to be high grade coal having minimized water
(Continued)

re-absorption and minimized spontaneous ignition possibility while saving energy by coating heavy oil directly on coal without using solvent oil. Provides is a method of modifying coal using palm oil residue, including milling the coal, homogenously mixing the palm oil residue with the milled coal, melting the palm oil residue mixed with the coal so as to be coated on a surface of the coal, and simultaneously drying moisture in the coal, cooling the dried coal, and briquetting the cooled coal.

5 Claims, 7 Drawing Sheets

(51) Int. Cl.
*C10L 9/00* (2006.01)
*C10L 5/22* (2006.01)
*C10L 5/04* (2006.01)
*C10L 9/10* (2006.01)
*C10L 5/14* (2006.01)
*C10L 5/36* (2006.01)
*C10L 5/30* (2006.01)

(52) U.S. Cl.
CPC .................. *C10L 5/361* (2013.01); *C10L 9/10* (2013.01); *C10L 5/30* (2013.01); *C10L 2290/06* (2013.01); *C10L 2290/08* (2013.01); *C10L 2290/20* (2013.01); *C10L 2290/28* (2013.01); *C10L 2290/30* (2013.01); *C10L 2290/32* (2013.01)

(56) References Cited

FOREIGN PATENT DOCUMENTS

KR 10-0960793 B1 6/2010
WO WO 2010089342 A1 * 8/2010 ............. C10B 53/02

* cited by examiner

(CWS : Cooling water supply, CWR : Cooling water return)

FIG. 10

METHOD FOR REFORMING COAL USING PALM RESIDUE

CROSS-REFERENCE TO RELATED PATENT APPLICATION

The present application is a national stage application of International Patent Application No. PCT/KR2012/007904, filed Sep. 28, 2012.

BACKGROUND OF THE INVENTION

1. Field of the Invention

The present invention relates to a method of modifying coal, and more particularly, to a method of economically modifying low rank coal into high grade coal by preventing moisture re-absorption by using palm oil residue that is solid at room temperature.

2. Description of the Related Art

Fossil fuels, such as oil, are a finite, non-renewable energy source. Further recent rises in oil prices and concern about global warming have increased the interest in renewable sources of energy. Thus, much research has been done to develop an alternative energy source, such as solar energy and bioenergy. However, its industrial use has not been feasible and the dependence on fossil fuels has increased. This is particularly a problem in countries such as South Korea where most coal mines are closed and that has to import coal from abroad such as Australia and Indonesia.

Coal is classified by its type, rank, and grade. The major types in order of lowest to highest rank are peat, brown coal, lignite, sub-bituminous coal, bituminous coal, and anthracite, in which brown coal and sub-bituminous coal are low rank coals (LRCs), and bituminous coal and anthracite are high rank coals (HRCs). Bituminous coal is further classified into low volatile, medium volatile and high volatile bituminous coal. Anthracite is subdivided into semi-anthracite, anthracite, meta-anthracite, and graphitic anthracite.

High rank coals, such as bituminous and sub-anthracite coals, which are required for coal thermal power generation, are expensive and the deposits thereof are limited. Thus from 1980s the efforts have been made to upgrade LRC, which has large deposits and a relatively low price compared to HRC.

For example, brown coal, one of the LRCs, is inexpensive compared to bituminous coal, but the utilization of brown coal for combustion has been low due to its high moisture content of 30 to 70% and low heating value of 2500 to 4000 kcal/kg.

Furthermore, LRC causes problems in transportation due to its heavy weight and large volume resulting from high moisture content in addition to spontaneous ignition. Thus, there are industrial and technological needs to upgrade LRC and prevent the spontaneous ignition.

Japanese Laid-Open Publication No. 1995-233383 discloses a method of preparing solid carbonaceous fuel materials, characterized in that a mixture of a heavy oil fraction and a solvent fraction is combined with porous coal to form a slurry, which is then heated to remove water, while also impregnating the coal with the mixture, which is then followed by a solid-liquid separation.

However, it has problems that the high cost solvent and heavy oil used in the method still remain in the coal and they are usually recovered through a separate process, which further complicates the method and increases preparation cost. Thus, there is still a need for improved methods.

SUMMARY OF THE INVENTION

The present invention provides a method of economically modifying low rank coal (LRC) by directly coating heavy oil on the LRC without using solvent oil.

Palm oil residue is solid at room temperature but turns into liquid at the temperature used for dewatering process of coals. Thus this property of palm oil residue makes it suitable for coating coals evenly at high temperature which turns to solid at room temperature.

According to an aspect of the present invention, there is provided a method of modifying coal using palm oil residue, including: milling the coal; homogenously mixing the palm oil residue with the milled coal; melting the palm oil residue mixed with the coal so as to be coated on a surface of the coal, and simultaneously drying moisture in the coal; cooling the dried coal; and briquetting the cooled coal.

The dried coal may be molded and then the coal briquettes may be cooled.

An average size of a coal grain after the milling of the coal may be not more than about 10 mm.

The palm oil residue of about 0.5% by weight to about 30% by weight of the coal may be mixed when homogeneously mixing the palm oil residue with the milled coal.

The mixing may include cutting the palm oil residue into a sliced form and then mixing the sliced palm oil residue with the milled coal.

The mixing may include melting the palm oil residue and then mixing the melted palm oil residue with the milled coal.

The coating and the drying may be performed in an indirect heat exchange type drying & coating machine, an internal temperature of the indirect heat drying & coating machine may be about 100° C. to about 115° C., and the coal may be moved inside the indirect heat drying & coating machine for mixing and has a residence time of about 20 minutes to about 70 minutes.

Moisture of the dried coal may be about 5% by weight to 20% by weight.

The method may further include collecting and reusing waste heat of a stream generated in the melting and the drying.

The reusing may include reusing the waste heat in heating preheating carrier gas.

The reusing may include reusing the waste heat in melting the palm oil residue before the palm oil residue is mixed with the coal.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1A:
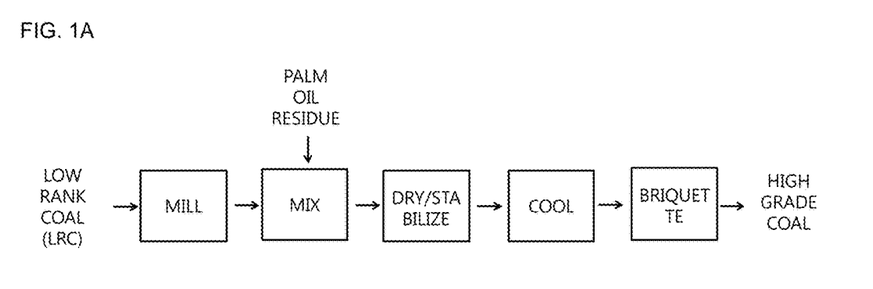
FIGS. 1A and 1B are conceptual diagrams illustrating a process of a method of modifying coal of the present invention.

Hereinafter, a method of modifying low rank coal (LRC) of the present invention will be described in detail with reference to FIGS. 1 to 5. As illustrated in FIG. 1A, the present invention has milling, mixing, drying/stabilizing, cooling and molding processes.

(a) Operation of Milling Coal

Coal is milled in a mill 1. For example, a jaw crusher, a pin mill, a hammer mill, or a roll mill may be used as the mill 1 of coal used in the present invention.

The average grain size milled in the milling operation of the present invention may be not more than 10 mm.

(b) Operation of Homogenously Mixing Milled Coal with Palm Oil Residue

Figure 2:
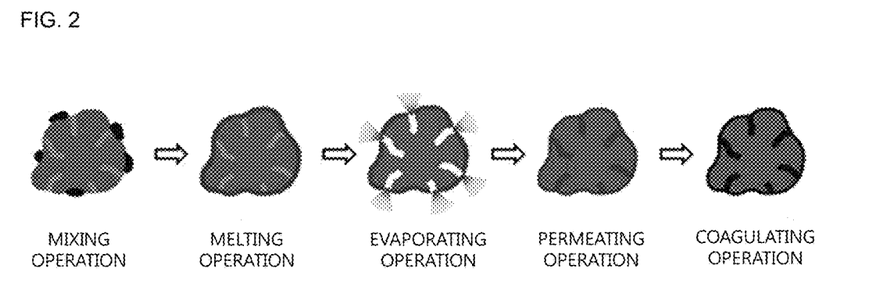
FIG. 2 is a diagram illustrating a stabilization process of the present invention.
Figure 3:
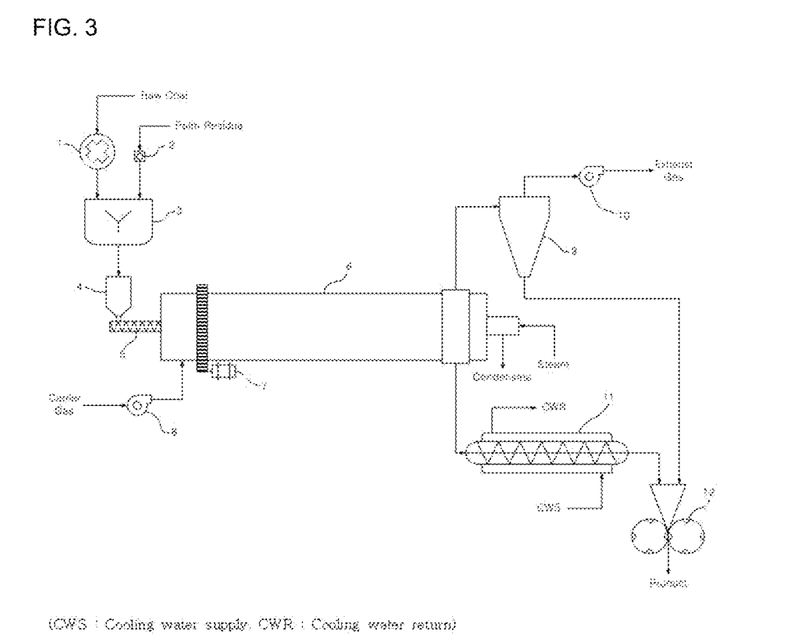
FIG. 3 is a diagram illustrating a detailed process of the present invention.
Figure 4:
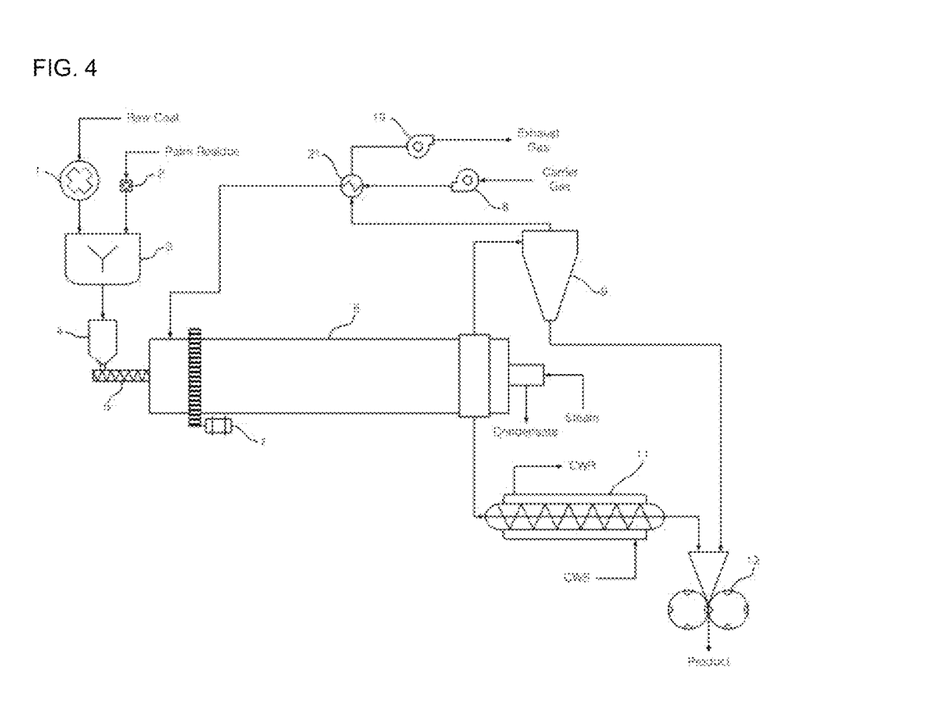
FIG. 4 is a diagram illustrating a process where waste heat of stream generated in a drying & coating machine is collected and is then used in preheating carrier gas.
Figure 5:
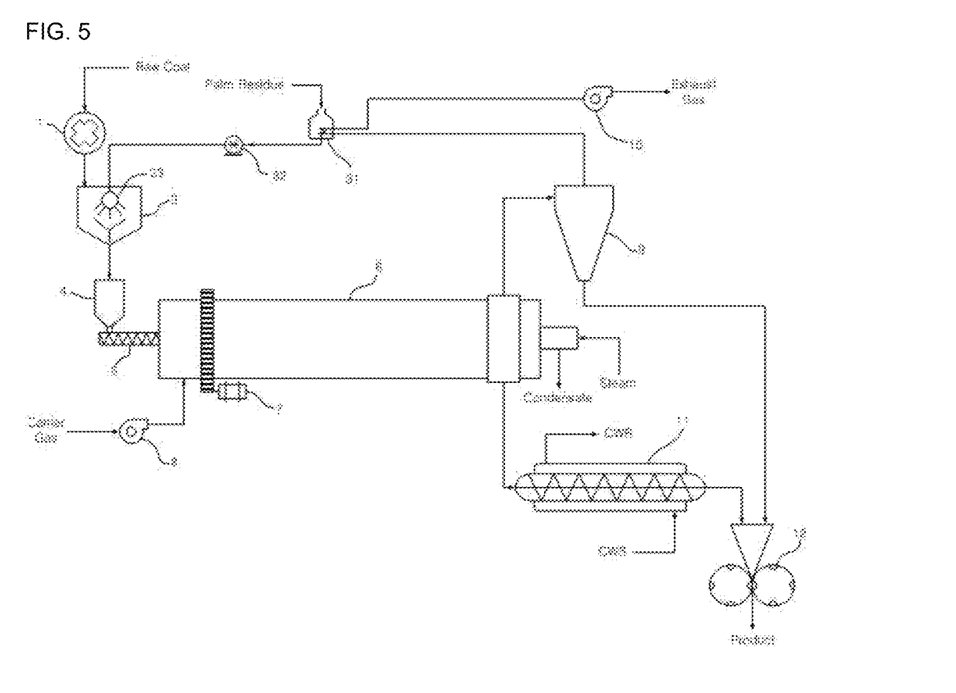
FIG. 5 is a diagram illustrating a process where waste heat of stream generated in a drying & coating machine is collected and is then used in melting palm oil residue.

Solid (high viscosity liquid) palm oil residue is homogeneously mixed with milled solid coal in a mixer 3 (FIGS. 3 and 4), or the palm oil residue is heated by using waste heat (steam/air) discharged in a drying & coating machine 6 to be converted into liquid and is then mixed (FIG. 5). These two methods may be used separately or together. The mixing operation is illustrated in FIG. 2. The amount of the palm oil residue mixed in an embodiment of the present invention corresponds to about 0.5 to about 30% by weight of the coal. The palm oil residue is residue after production of palm oil in Indonesia, Malaysia, etc. Some examples of the palm oil residue include palm fatty acid distillate (PFAD) and palm sludge oil (PSO), and the palm oil residue has a high heating value of not less than about 9,000 kcal/kg.

In the above operation, the palm oil residue and the coal have been physically mixed, and thus the palm oil residue has not been coated on the surface of the coal, but the palm oil residue and the coal have been mixed. In the present embodiment, if the palm oil residue is mixed in a solid state, the palm oil residue is used after being cut in a sliced form using a cutter 2. The coal mixed with the palm oil residue in the mixer 3 is moved to a silo 4.

(c) Dry-Stabilizing Operation where Palm Oil Residue Mixed with Coal is Coated on the Surface of the Coal while Water in the Coal is Also Dried The coal mixed with the palm oil residue in the silo 4 is transferred to the drying & coating machine 6. The palm oil residue on the surface of the coal is melted to coat the surface, and the moisture in the coal is evaporated in the drying & coating machine 6. In the mixing operation, as the temperature rises, the palm oil residue attached on the surface of the coal is melted and is diffused on the entire surface of the coal (melting operation of FIG. 2). Thereafter, as moisture in pores in the coal evaporates by heat transfer (evaporation operation of FIG. 2), a vacuum state is formed and the palm oil residue having diffused on the surface of the coal permeates the pores (permeation operation of FIG. 2). In an exemplary embodiment of the present invention, the drying & coating machine 6 is an indirect heat transfer type, has sufficient residence time of about 20 min. to about 70 min., and has a mixing effect in the movement of the coal. In the embodiment, a driving motor 7 is installed in the drying & coating machine 6 for movement of the coal. In the embodiment of the present invention, the drying & coating machine 6 may use a steam tube dryer or a rotary disk dryer to heat the coal up to about 120° C. to about 180° C. for evaporation and drying. The drying & coating machine 6 may include a steam supply device for heating and a discharge device of condensed water after use of the supplied steam. The drying & coating machine 6 may use general carrier gas such as nitrogen and exhaust gas, and transfers carrier gas by using a forced draft (FD) fan 8.

The internal temperature of the drying & coating machine 6 is maintained at about 100° C. to 115° C. and the melting point of the palm oil residue is about 40° C. to about 60° C., and thus the melting of the palm oil residue and the drying of the moisture of the coal are simultaneously performed. The coating of the palm oil residue on the surface of the coal is completed within about 20 minutes, and thus the residence time of the drying & coating machine may be adjusted to about 20 minutes to about 70 minutes according to the moisture content of the coal. The moisture of the dried coal may be set to be about 8% by weight to about 15% by weight.

(d) Cooling Operation of Coal after Drying-Stabilizing Operation

The temperature of coal discharged from the drying & coating machine 6 is high (about 100° C.), and thus if the coal is left alone, there is a possibility of spontaneous ignition. Thus, thereafter, an operation of cooling the dry-stabilized coal is performed using a cooler 11. Until the previous operation, the coal maintains the heated temperature and a state where the palm oil residue is coated on the surface of the coal is maintained. However, as the coal is cooled to room temperature, the palm oil residue coated on the coal is transformed again into solid (coagulation operation of FIG. 2) so as to prevent re-absorption and maximize stabilization effects of reducing the possibility of spontaneous ignition. In the cooling operation, a common device used in cooling, such as the cooler 11, may be used.

The exhaust gas exhausted from the drying & coating machine 6 is transferred to a cyclone 9 so as to collect dust coal contained in the exhaust gas and supply the collected dust coal to a molder 12. In the embodiment of the present invention, the exhaust gas having removed dust gas is exhausted by using an induced draft (ID) fan 10.

(e) Operation of Briquetting Coal after Cooling Operation

The finally dried and discharged coal is molded for easy long time transfer by using the briquetting machine 12. At this time, the moisture and palm oil residue remaining in the coal serves as a binder of the coal briquettes, and the palm oil residue coated on the surface of the coal prevents water re-absorption and enhances a heating value. The briquetting process is performed by pressing the coal, and in the present embodiment, an oval briquette is prepared by the briquetting process.

Figure 1B:
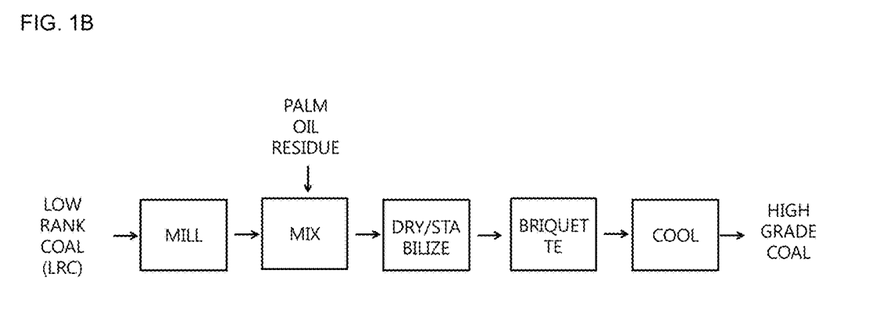

As illustrated in FIG. 1B, the order of the cooling operation and the briquetting operation may be changed.

(f) Operation of Collecting and Reusing Waste Heat

Waste heat generated in the drying & coating machine 6 is collected. The collected heat may filter dust coal in the cyclone 9 and then move to the drying & coating machine 6 via a heat exchanger 21 so as to be used in preheating the carrier gas, as illustrated in FIG. 4, or may filter dust coal in the cyclone 9 and then move to a heater 31 that heats the palm oil residue so as to be used in melting the palm oil residue, as illustrated in FIG. 5. When the palm oil residue is melted before mixed, the liquid palm oil residue may be directly sprayed on the mixer 3, thereby enhancing the homogeneity of the mixture of the coal and the palm oil residue, and in this case, the mixed proportion of the palm oil residue may be reduced. In the present embodiment, a pump 32 and a spray nozzle 33 are used to spray the palm oil residue.

Hereinafter, the present invention will be described in detail through an exemplary embodiment.

Embodiment

Indonesian sub-bituminous coal was milled to be about 0.5 mm to about 3 mm, and then 1 kg of coal was mixed with 50 g of PFAD. The mixture is inserted into a rotary kiln type electric furnace, and air is discharged as carrier gas at 51 liters/min. while maintaining the internal temperature of kiln at about 105° C. to 110° C. by setting the kiln temperature to 160° C. After dry coating for 70 minutes, of 5 g of modified coal is maintained at 10 tons by using Atlas™ 15T manual hydraulic press (Specac Ltd., UK) so as to produce pellets.

Figure 6:
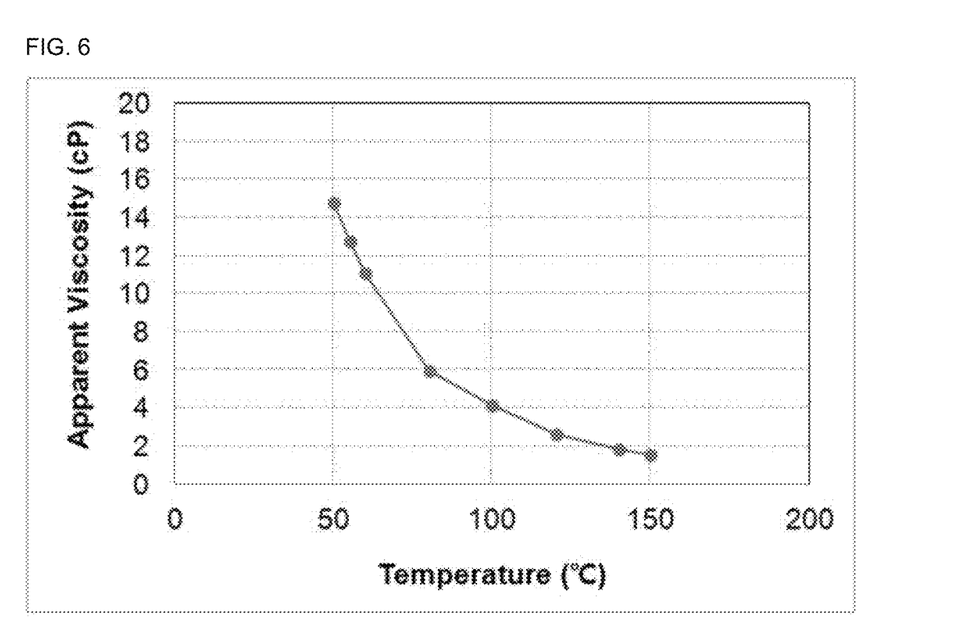
FIG. 6 is a diagram illustrating a result of measuring viscosity of palm fatty acid distillate (PFAD) by temperatures.

The result of measuring viscosity by temperatures of the PFAD is shown on FIG. 6. DV-III Ultra (Brookfield Engineering Laboratories, Inc., USA) was used as a device for measuring viscosity. The viscosity at 50° C. was about 15 cP, which is a very low viscosity, and the viscosity further decreases as the temperature rises. The viscosity is very low compared to other heavy oils, and thus when the coal is melted at a high temperature, the surface of the coal may be easily coated, which is an advantage.

The properties of raw coal and the modified coal are shown in Table 1 below. The industrial analysis and heating value are based on the final material, and devices for analysis are as follows:

TGA-701 Thermogravimeter (LECO Co., USA)

Parr 6400 Calorimeter (PARR Co., USA)

The result of the analysis shows that the heating value of the modified coal through an embodiment of the present invention increases to 5,862 kcal/kg compared to 4,370 kcal/kg of the raw coal.

TABLE 1

Properties of raw coal and modified coal

| Item for analysis Material | Industrial analysis (% by weight) | | | | Heating value Kcal/kg |
|---|---|---|---|---|---|
| | Moisture (M) | Volatile matter (VM) | Ash | Fixed carbon | |
| Raw coal | 29.95 | 36.57 | 4.27 | 29.21 | 4,370 |
| Modified coal | 10.4 | 51.31 | 6.45 | 31.84 | 5,862 |

It is generally known that, if coal is molded into an oval briquette form, a possibility of spontaneous ignition is significantly reduced compared to milled coal. Nevertheless, the spontaneous ignition in the case of milled coal was also examined. A cross point temperature (CPT), which is generally used as an indicator of a possibility of spontaneous ignition, was measured and is shown on Table 2 below. A higher CPT indicates that spontaneous ignition is better prevented. Modified coal exhibited a possibility of spontaneous ignition that is similar to that of bituminous coal.

TABLE 2

Comparison of CPT

| Type of coal | CPT |
|---|---|
| Raw coal | 146 |
| Modified coal | 156 |
| Bituminous coal | 157 |

For a strength test, a device used at the pellet production was used. In order to compare strength, coal was dried to have moisture of 10% by weight as in modified coal and a pellet was then prepared. Destroyed weight was measured by applying pressure to the pellet, and dried coal and modified coal had the same result was of 600 kg. Palm oil residue had no difference in strength.

Figure 7A:
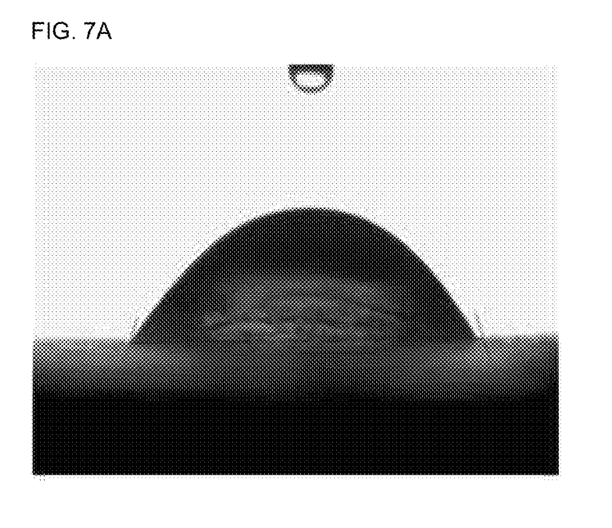
FIG. 7A is a diagram illustrating an initial state of measuring a contact angle for water droplet of dried coal containing moisture of 10% by weight.
Figure 7B:
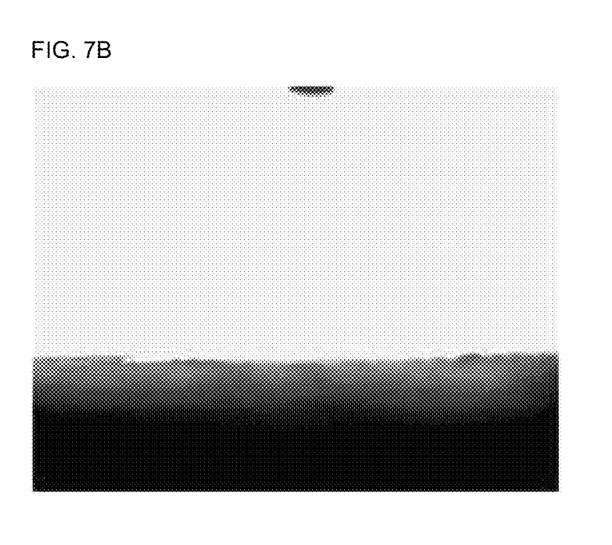
FIG. 7B is a diagram illustrating a state after 10 seconds from the start time of measuring a contact angle for water droplet of dried coal containing moisture of 10% by weight.
Figure 8A:
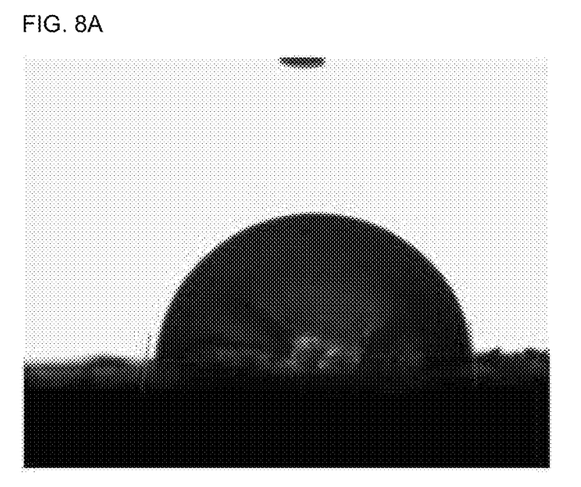
FIG. 8A is a diagram illustrating an initial state of measuring a contact angle for water droplet when dried coal containing moisture of 10% by weight is mixed with PFAD of 5%.
Figure 8B:
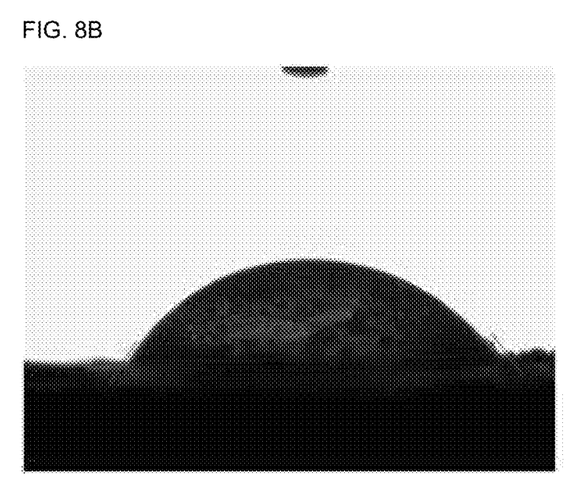
FIG. 8B is a diagram illustrating a state after 10 seconds from the start time of measuring a contact angle for water droplet when dried coal containing moisture of 10% by weight is mixed with PFAD of 5%.
Figure 9A:
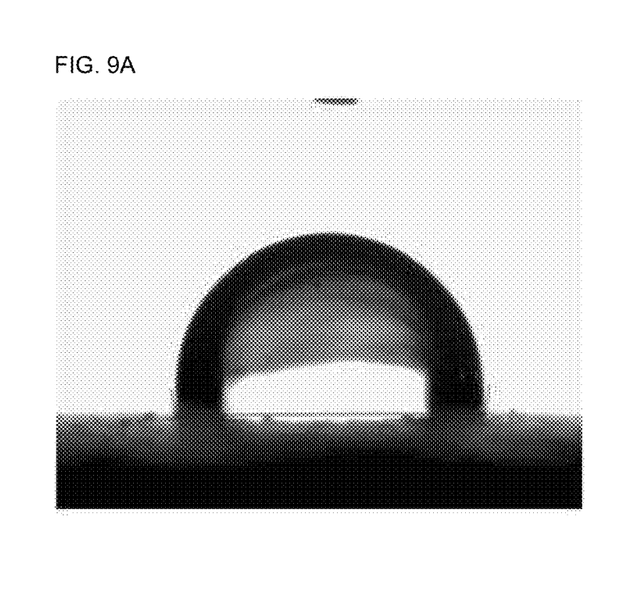
FIG. 9A is a diagram illustrating an initial state of measuring a contact angle for water droplet of modified coal of the present invention.
Figure 9B:
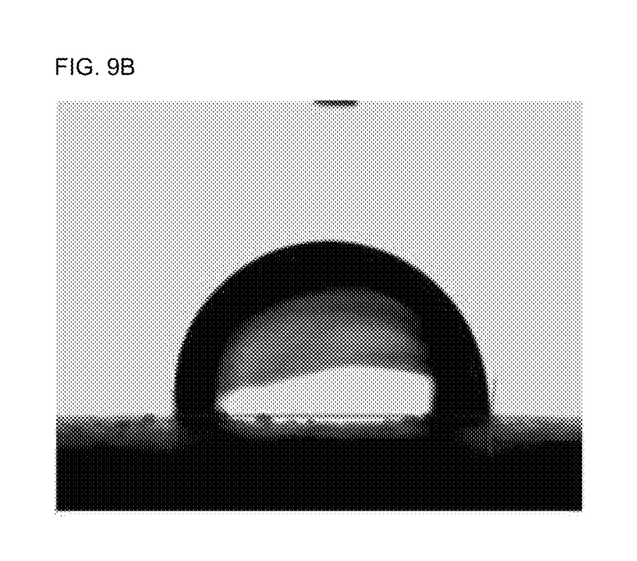
FIG. 9B is a diagram illustrating a state after 10 seconds from the start time of measuring a contact angle for water droplet of modified coal of the present invention.
Figure 10:
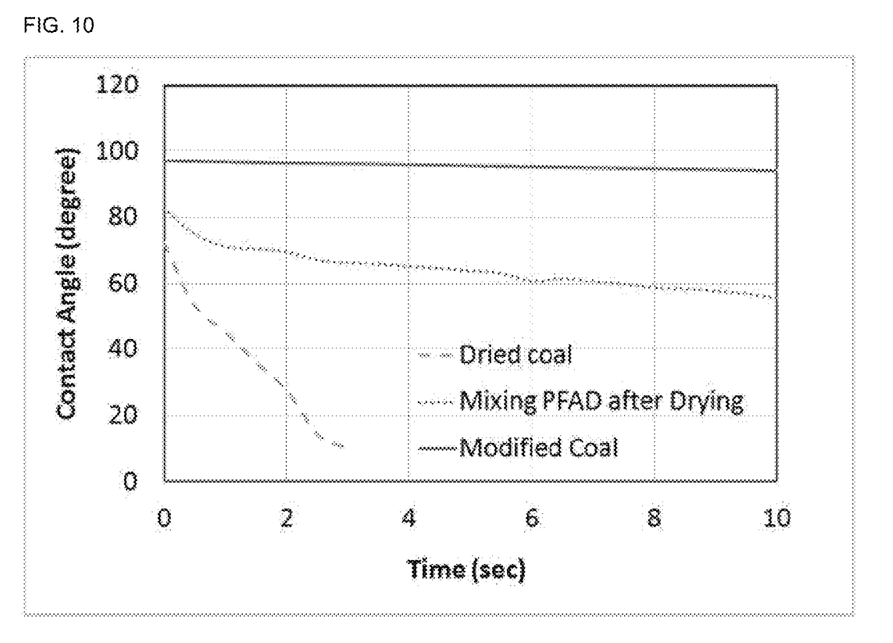
FIG. 10 is a diagram illustrating a result of comparing contact angle changes as times passes for each coal.

Water was introduced to the surface of the molded coal for moisture re-absorption test of the molded coal as shown in FIGS. 7 to 9, and the phenomenon was observed. Here, SEO-300A (SEO Co., Korea), which is a device for measuring a contact angle, was used. A pellet of dried coal (FIG. 7) having moisture of 10% by weight was prepared for comparison, and in order to verify the modification process, coal was dried to have moisture of 10% by weight and the dried coal was mixed with PFAD of 5% by weight (FIG. 8) to prepare a pellet. In the case of dried coal, a water droplet was quickly absorbed as soon as the water droplet touched the surface of the molded coal. In the case where PFAD was mixed after drying, water was absorbed by the molded coal (FIGS. 8A and 8B) even if there was some difference in absorption rate. In the case of modified coal, a water droplet remained intact without being absorbed on the surface (FIGS. 9A and 9B). Referring to a change of a contact angle according to time of FIG. 10, in the case of dried coal, the contact angle rapidly decreased from initial 72 degrees, and in the case of coal mixed with PFAD after drying, the contact angle gradually decreased from an initial 83 degrees to 56 degrees for 10 seconds. Modified coal had the largest initial contact angle of 97 degrees, and the contact angle after 10 seconds was 94 degrees showing little change.

The method of modifying LRC of the present invention, in which palm oil residue is directly mixed with coals, reduces costs and enhances the efficiency of the modification process, and because the palm oil residue having a high heating value is coated on the surface of the coal, the average heating value of the coal increases and the possibility of moisture re-absorption and spontaneous ignition of coal is minimized.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of coating coal with palm oil residue, the method comprising:
    (a) milling the coal;
    (b) homogenously mixing the milled coal with the palm oil residue in an amount of about 0.5 wt. % to about 30 wt. % based on the weight of the coal;
    (c) melting the palm oil residue mixed with the coal so as to coat a surface of the coal while simultaneously drying moisture in the coal;
    (d) cooling the dried coal; and
    (e) molding the cooled coal; or
    performing the step (d) followed by (e),
    wherein the coating and the drying are performed in an indirect heat exchange type drying & coating machine, an internal temperature of the indirect heat drying & coating machine is about 100° C. to about 115° C., and the coal is moved inside the indirect heat drying & coating machine for mixing and has a residence time of about 20 minutes to about 70 minutes.

2. The method of claim 1, wherein an average size of a coal grain after the milling of the coal is not more than about 10 mm.

3. The method of claim 1, wherein the mixing comprises cutting the palm oil residue into a sliced form and then mixing the sliced palm oil residue with the milled coal.

4. The method of claim 1, wherein the mixing comprises melting the palm oil residue and then mixing the melted palm oil residue with the milled coal.

5. The method of claim 1, wherein moisture of the dried coal is about 5% by weight to 20% by weight.

* * * * *